Nov. 3, 1953  B. SIMPSON  2,657,937
PERAMBULATOR AND LIKE VEHICLE HAVING
A TOGGLE-OPERATED BRAKE MECHANISM
Filed March 3, 1949  2 Sheets-Sheet 1

Inventor
B. Simpson
By Glascock Downing Seebold
Attys.

Patented Nov. 3, 1953

2,657,937

UNITED STATES PATENT OFFICE 2,657,937

PERAMBULATOR AND LIKE VEHICLE HAVING A TOGGLE-OPERATED BRAKE MECHANISM

Barry Simpson, Billacombe, near Plymouth, England, assignor of one-half to Simpson, Fawcett & Company Limited, Billacombe, England Application March 3, 1949, Serial No. 79,447

Claims priority, application Great Britain March 12, 1948

3 Claims. (Cl. 280—47.38)

This invention relates to perambulators and like vehicles of the kind in which extension of the wheel base through the operation of suitable toggle mechanism brings braking means into operation to prevent the perambulator or the like moving away from a position of rest.

The object of the present invention is to provide an improved vehicle of this character and according to the invention the movement of the toggle mechanism (and consequently extension of the wheel base) is controlled by springs concealed within tubular parts constituting part of the chassis of the vehicle.

Further features of the invention will be apparent from the description given hereafter.

The accompanying drawings illustrate one convenient form of construction in accordance with the invention.

Figure 3 is a fragmentary view in end elevation.

In carrying the invention into effect in one convenient manner, as for example, in its application to a perambulator, the body of the perambulator (not shown) is suspended upon two C-shaped tubular side members $a$ and the front wheel axles $b$ are carried by a transverse tubular member $c$ which is welded or otherwise secured to tubular pieces $d$ riveted below the C members above referred to.

The axles $e$ for the rear wheels are carried at the end of a transverse tubular member $f$ which is welded or otherwise secured to longitudinal tubular or rod-like members $g$ slidable axially in relation to the members $d$ carrying the front wheel axle so that the rear wheels $w$ may be moved away from the handle and nearer to the front wheels $w'$ when a light balance is desirable for easily propelling the perambulator and away from the front wheels and towards the handle so as to bring the rear wheels into engagement with brake members $h$ when the vehicle will be prevented from moving away from a position of rest and a heavy tip will be required to raise the front wheels from the ground.

The member $f$ secured to the movable members $g$ carrying the rear wheel axles is pivotally connected to a preferably U-shaped toggle lever $i$ which may be of tubular construction, and the limbs of this lever are connected to the levers $k$ forming the other parts of the toggle mechanism and pivoted at the fixed points $k'$.

The toggle link mechanism is controlled by springs $l$ concealed within the fixed tubular portions $d$ carrying the front wheel axle, the springs being if desired fitted with suitable spring caps against which the movable axle bearing members abut, said movable members being mounted for sliding movement in straps riveted or otherwise secured to the lower portions of the side C members.

The levers $k$ of the toggle link mechanism may have secured thereto brackets $m$ or the like in which the U member $i$ rests when in its lowest position, that is, in the position when the rear wheels are free of the braking means $h$. The brake means themselves may consist of rubber or like sleeves mounted upon tubular members extending laterally from brackets welded or otherwise secured to the C members.

Figure 1:
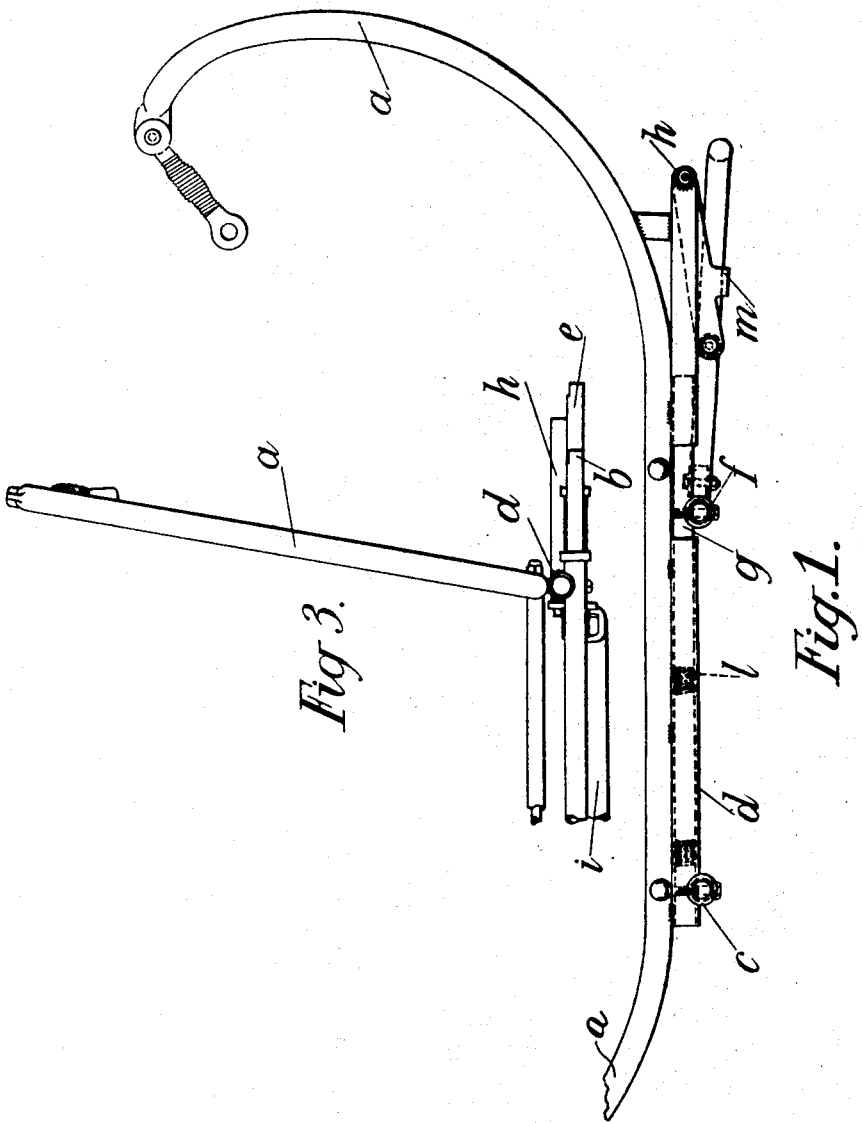
Figure 1 is a side elevation.
Figure 2:
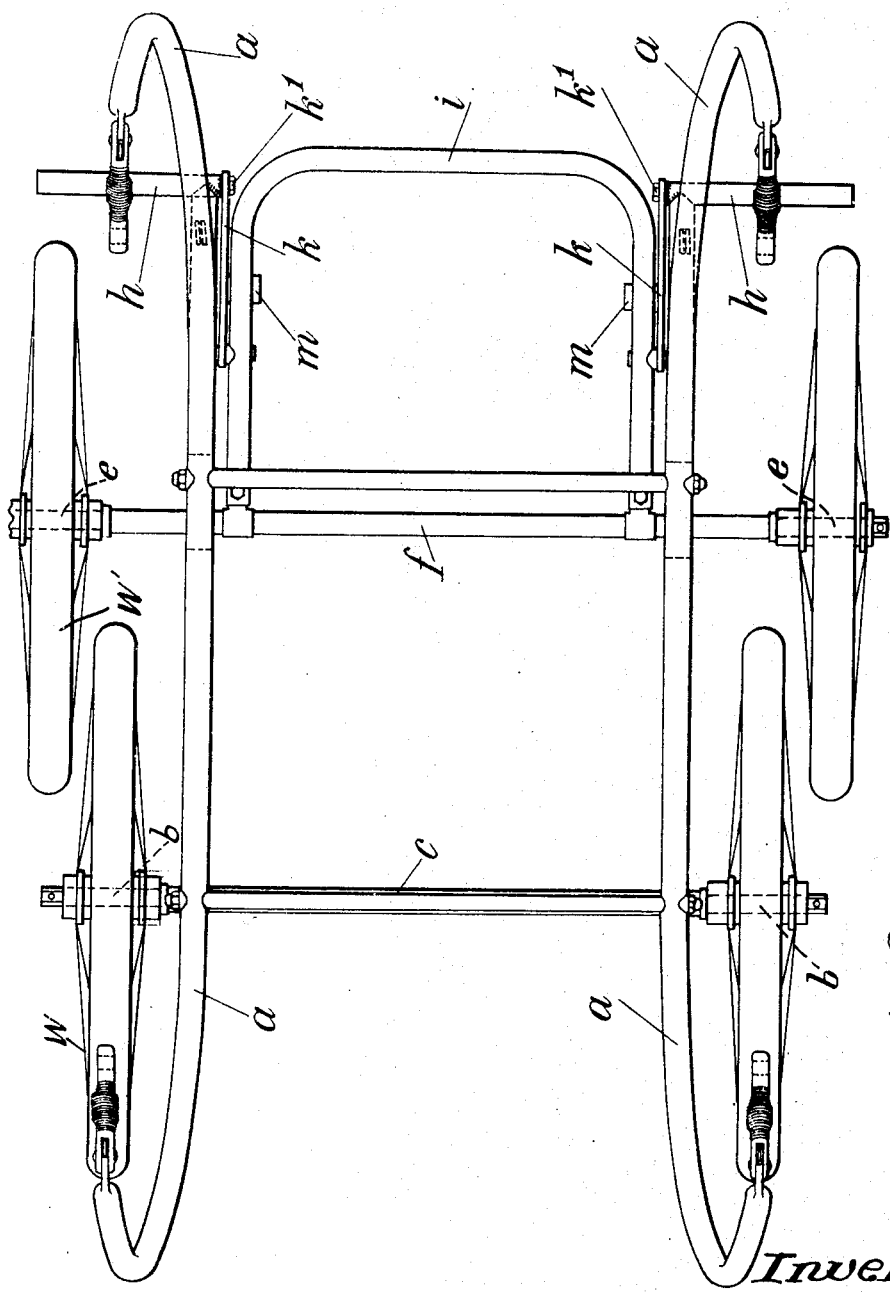
Figure 2 is a plan.

In operation, supposing the U-shaped lever $i$ to be in the lowered position shown in Figure 1, the lever will be thrust in an axial direction by spring $l$, whereupon links $k$ will exert a downward leverage about pivots $k'$, constraining lever $i$ to bear against brackets $m$, this representing one stable position of the toggle mechanism in which the inner end of each link $k$, and hence lever $i$, member $f$ and the rear axles $e$ are maintained a predetermined distance from the front axles $b$ and in which the rear wheels are clear of brakes $h$.

If now lever $i$ is swung upwards about axis $f$, suitably by the toe of the foot, the toggle mechanism will pass through a metastable position in which lever $i$ and links $k$ are parallel, whereafter the force exerted by springs $l$, transmitted through members $g$ and lever $i$ to links $k$, will swing the latter upwards about pivots $k'$ and cause lever $i$ to be swung further upwards thereby. Such upward movement of links $k$ will simultaneously carry lever $i$ in a direction away from front axles $b$ with consequent retraction of members $g$ from tubular members $d$, this movement continuing with separation of the wheel axles $b$, $e$, until the second stable position of the toggle mechanism is reached in which the rear wheels fetch up against brakes $h$.

The arrangement in accordance with the invention is not only convenient to manipulate but also presents no unsightly parts, and the springs in addition to being concealed from view are protected against mud or other foreign matter that might adhere to them and interfere with their proper operation were they exposed as is usual with vehicles of the character to which the invention relates.

I claim:

1. In a perambulator or like vehicle comprising a body, a forward pair of wheels, a rearward pair of wheels, said body being carried by said pairs of wheels, one of said pairs of wheels being movable longitudinally of the body, toggle mechanism operatively connected to said movable pair of wheels for reciprocating said movable pair of wheels towards and away from the other pair, and a brake supported by the body and located in the path of movement of said movable pair of wheels to act as a stop limiting the movement of said movable pair away from the other pair with concomitant engagement against the wheels of said movable pair to prevent rotation thereon, telescopic stays adjustably spacing said pairs of wheels apart and comprising a tubular member, and a spring within said tubular member and operatively associated with the toggle mechanism for exerting a thrust upon said toggle mechanism.

2. In a perambulator or like vehicle as set forth in claims, axles one for each said pair of wheels, said telescopic stays each comprising a plunger slidably engaged in the respective tubular member and bearing against the spring housed therein, said axles being secured towards each end one to the tubular members and one to the plungers.

3. In a perambulator or like vehicle as set forth in claim 2, a pair of C-shaped members on which said body is suspended, said toggle mechanism comprising a U-shaped lever the limbs of which are pivoted to said plungers and, at a different position, to links, said links being pivoted at points fixed relative to said C-shaped members.

BARRY SIMPSON.

References Cited in the file of this patent

UNITED STATES PATENTS

| Number | Name | Date |
|---|---|---|
| 292,933 | McKnight | Feb. 5, 1884 |

FOREIGN PATENTS

| Number | Country | Date |
|---|---|---|
| 403,682 | Great Britain | Dec. 28, 1933 |